United States Patent [19]

Brison

[11] Patent Number: 4,951,840

[45] Date of Patent: Aug. 28, 1990

[54] PUMP DISPENSER FOR DISPENSING ACCURATE SMALL QUANTITIES OF A FLUID SUBSTANCE

[75] Inventor: Marc Brison, Le Roger, France

[73] Assignee: Valois (Societe Anonyme), LeNeubourg, France

[21] Appl. No.: 337,991

[22] Filed: Apr. 14, 1989

[51] Int. Cl.$^5$ .............................................. B67B 7/46
[52] U.S. Cl. ...................................... 222/82; 222/321; 222/383
[58] Field of Search ................ 222/321, 378, 383, 490, 222/494, 402.23, 82; 128/200.14; 604/298; 239/333

[56] References Cited

U.S. PATENT DOCUMENTS

| | | | |
|---|---|---|---|
| 515,661 | 2/1894 | Day | 187/41 |
| 1,989,714 | 2/1935 | Statham | 222/490 |
| 3,194,447 | 7/1965 | Brown | 222/321 |
| 3,211,346 | 10/1965 | Mestberg | 222/321 |
| 3,323,661 | 6/1967 | Chasai | 187/41 |
| 3,877,617 | 4/1975 | Stevens | 222/321 |
| 4,227,650 | 10/1980 | McKinney | 222/494 |
| 4,311,425 | 1/1982 | Palda | 187/41 |
| 4,728,006 | 3/1988 | Drobist et al. | 222/490 |

FOREIGN PATENT DOCUMENTS

| | | | |
|---|---|---|---|
| 1756343 | 4/1970 | Fed. Rep. of Germany | 187/41 |
| 383944 | 3/1908 | France | 187/41 |
| 2346056 | 10/1977 | France | 222/321 |

Primary Examiner—H. Grant Skaggs
Attorney, Agent, or Firm—Sughrue, Mion, Zinn, Macpeak and Seas

[57] ABSTRACT

In a pump dispenser for dispensing accurate small quantities of a fluid substance, e.g. an ophthalmological substance, comprising a pump body (1), a piston (5) movable between two positions, a suction orifice, and a discharge orifice, the opening through the suction orifice is directly and positively controlled by displacement of the piston using a slide valve type of mechanism, with the discharge orifice being provided with a non-return valve and with the compression chamber of the pump being annular in shape between the piston and the pump body.

15 Claims, 4 Drawing Sheets

PUMP DISPENSER FOR DISPENSING ACCURATE SMALL QUANTITIES OF A FLUID SUBSTANCE

BACKGROUND OF THE INVENTION

The present invention relates to a pump dispenser for dispensing accurate small quantities (doses) of medical or hygienic fluid substances, and in particular ophthalmological substances for treating the eye or for eye hygiene. The object to be achieved is that each time the device is actuated a quantity of substance equal to one drop is expelled from a receptacle, i.e. a volume of about 20 to 50 microliters (cubic millimiters) to within plus or minus about 8%. Even with such a wide tolerance, it is necessary to have a very accurate mmechanism when dispensing such a small quantity. The substance to be dispensed may be an oil, a gel, or a very fluid eye lotion. The device must therefore be capable of dispensing substances having very different viscosities. Since the dispenser device is generally sterile, it is important, except when the device is in use, to avoid contact between the substance and air in the vicinity of the expulsion orifice, in order to avoid polluting the substance. It is also necessary to avoid contact with metal parts such as springs in order to avoid chemical reactions. The device must be capable of being screwed to an aluminum tube or to a glass flask. Finally, it may be observed that such a device is discarded after use. It constitutes a kind of throwaway packaging and its manufacturing cost must therefore be relatively cheap.

Prior devices of the positive displacement type or of the metering valve type are unsuitable for meeting these conditions.

SUMMARY OF THE INVENTION

The present invention provides a dispenser device of the piston pump type for dispensing accurate small quantities of a fluid substance, in particular an ophthalmological substance, the device comprising a pump body including a pump chamber having a suction orifice and a discharge orifice, a piston movable between two positions within said pump chamber, and an actuator rod, wherein the piston has two axially separated sealing lips with a discharge orifice opening out between the two lips and in communication with a central discharge duct running along the axis of the piston and the actuator rod, the piston having an extension or head at its end opposite from the actuator rod and suitable, on piston displacement, for closing the suction orifice, the pump chamber being formed with shapes in relief, e.g. grooves, disposed in such a manner that the closest sealing lip to said extension no longer provides sealing when the piston is in positions for which said extension closes the suction orifice, the discharge orifice being provided with a non-return valve that opens under the effect of compression pressure in the compression chamber.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS

Figure 1:
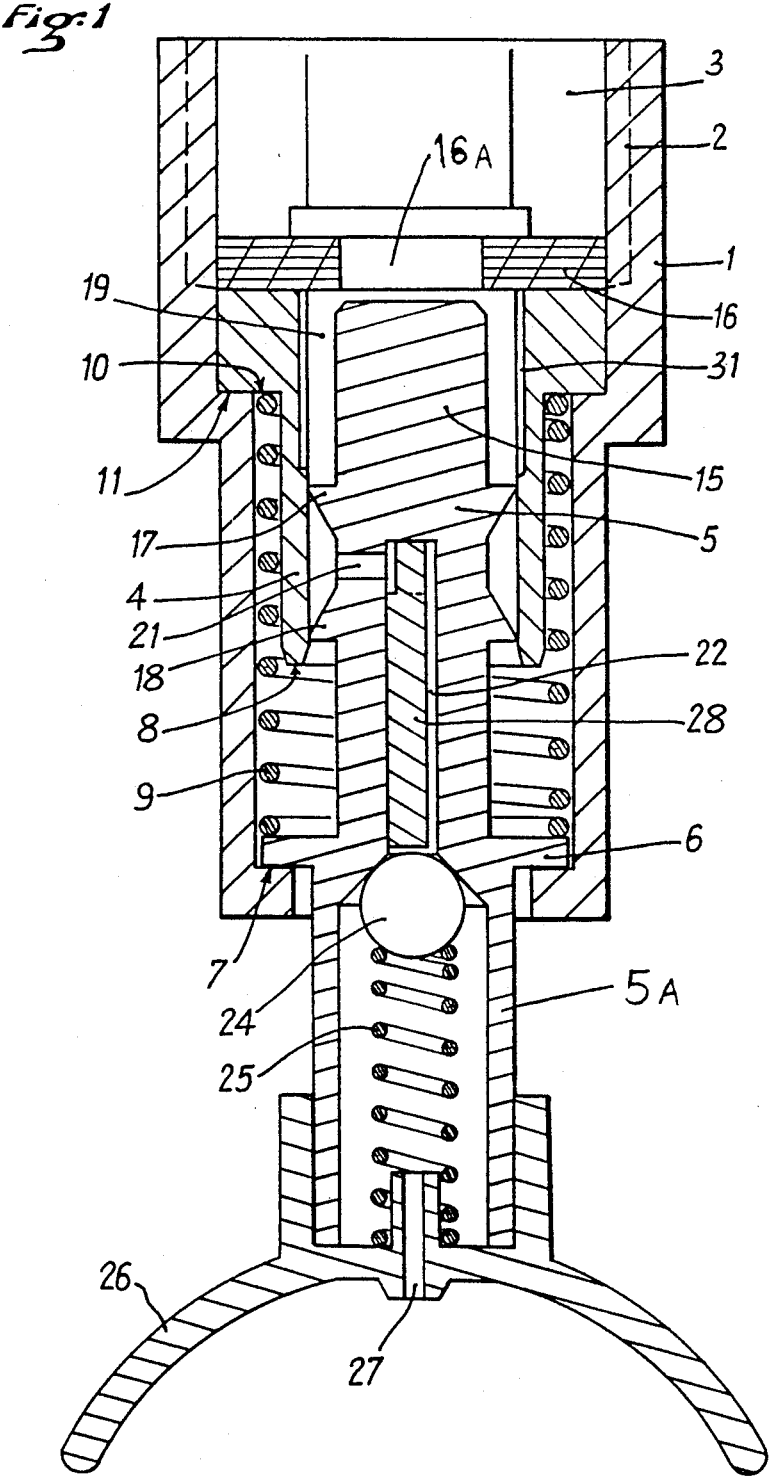
FIGS. 1 and 2 are axial sections through a first embodiment of the invention, with FIG. 1 being in the rest state and FIG. 2 being shown after a quantity of substance has been dispensed.
Figure 2:
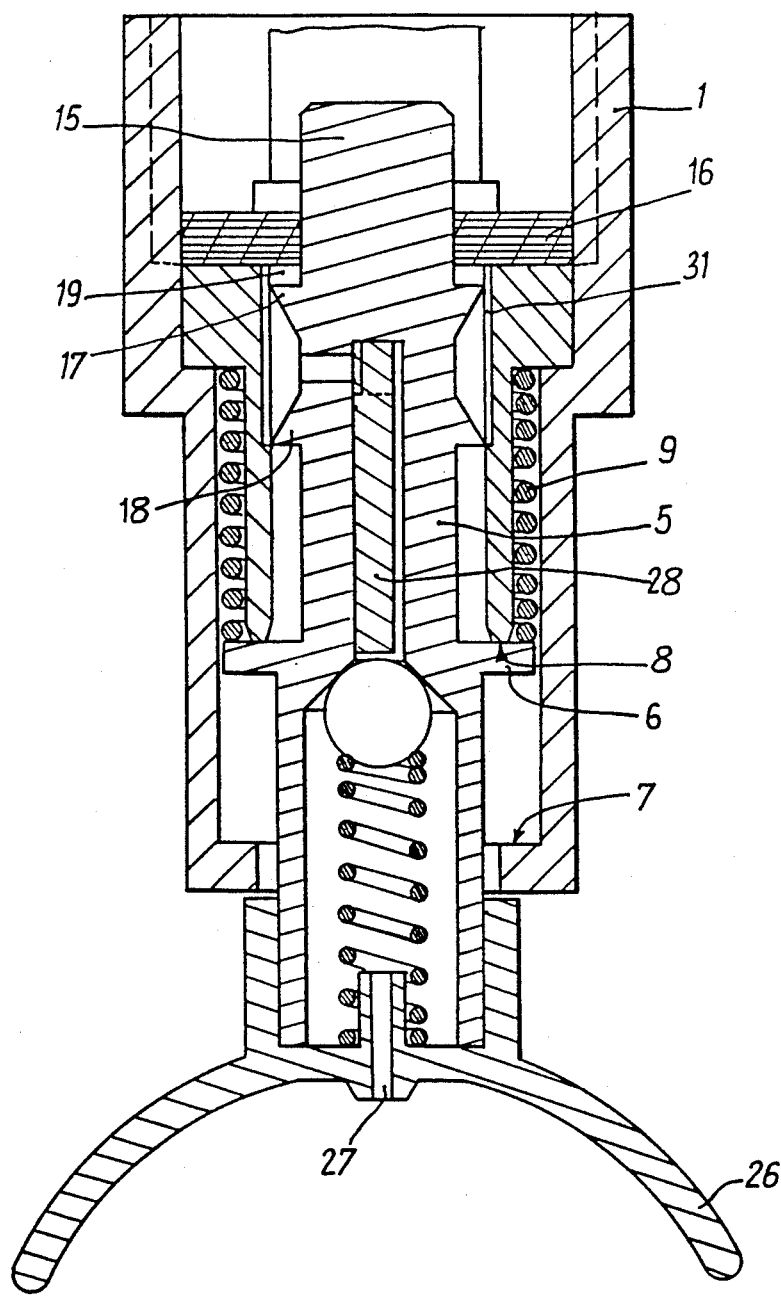

The device comprises a pump body 1 which is generally cylindrical in shape having a discharge non-return valve at one end, and having means at its other, or suction, end for fixing on a receptacle. The receptacle normally stands on a surface or lies, for example, in a user's pocket, so that the outlet orifice of the device is oriented upwardly or horizontally. However, a flask provided with the device is used when in the upside-down position, i.e. with the discharge orifice pointing downwards so as to allow a drop of substance to escape. The device is shown in this position in FIGS. 1 to 4. In FIGS. 1 and 2, a screw thread 2 is shown diagrammatically for fixing the pump on a receptacle 3, e.g. an aluminum tube or a glass flask.

A piston 5 is received inside the pump body in such a manner as to be capable of moving axially. The piston is fixed to a rod 5A for controlling displacement thereof. Movement of the piston is limited in each direction by a collar-shaped abutment 6: going downwardly it engages a shoulder 7 formed at the bottom end of the pump body; and going upwardly it engages the bottom edge 8 of a sleeve 4 fixed to the pump body. The sleeve is made in the form of a separate part in order to facilitate molding and assembly. A spring 9 is disposed between the pump body and the sleeve coming into contact against a shoulder 10 which it urges upwardly. The downward end of the spring presses against the collar 6 of the piston so that in the rest state it maintains said collar against the shoulder 7, in the position shown in FIG. 1.

The shoulder 10 on the sleeve 4 is pressed against a step 11 formed in the body of the pump. These two parts may be welded or glued together at this point, or they may merely be engaged to one another as a tight fit. This position is maintained when the device is in use by the pump body being screwed to the flask.

The piston has a cylindrical head 15 at its end opposite to the actuator rod 5A, said head being intended to co-operate with a washer-shaped sealing ring 16 whose opening 16a constitutes the suction orifice of the pump chamber. When the piston is raised within the pump body against the force of the spring 9, the head engages in the washer 16 closing the passage therethrough. The piston has two sealing lips: a top lip 17 and a bottom lip 18. In the position where the top end of the head 15 closes the opening through the washer 16, a metering volume or annular compression chamber 19 is defined between the head 15 and the sleeve 4, which volume is delimited at its top end by the washer 16 and is closed at its bottom end by the top sealing lip 17. A radial channel 21 opens out between the two lips 17 and 18 and is in communication with an axial channel 22 disposed axially along the rod 5A of the piston, and extending downwardly to the end of the rod. This channel is closed by a non-return valve which prevents air from returning in untimely manner into the pump chamber, and which enables the pump to be primed. In FIGS. 1 and 2, the non-return valve is a ball 24 held in the closed position by a spring 25. The bottom end of the device terminates with an eyepiece 26 having an ejection orifice 27. In order to reduce the cross-section of the axial channel 22, a space-filling pin 28 may be placed inside it.

This arrangement simplifies molding and facilitates priming.

The top of the sleeve has grooves 31 running along its inside cylindrical surface from the top down to a level which is slightly above the level of the top lip 17 when the piston is in the rest position (FIG. 1).

The device operates as follows. In the upsidedown position as shown in FIGS. 1 and 2, the substance to be dispensed, if fluid, spreads easily into the chamber 19 delimited by the head 15 and the sleeve 4 via the opening 16A through the sealing ring 16 and down to the top lip 17. If the substance is not fluid, it will need to be primed by acting several times on the pump. It is now assumed that the chamber 19 is filled with the substance to be dispensed. The piston 5 is moved up the pump body 1. As soon as it begins to move, the head 15 closes the opening 16A through the washer 16, thereby closing the chamber 19. Then, the lip 17 reaches the level of the grooves 31, thereby breaking the seal provided by the lip. In accordance with the invention, it is possible for the head to close the seal 16 prior to the lip 17 reaching the groove 31, thereby setting up a degree of precompression which is absorbed by the sealing ring 16. As the piston moves upwards, the volume of the chamber 19 diminishes, and the substance contained in the chamber is expelled beyond the lip 17 along the grooves 31. Thereafter, since the substance cannot get past the sealing bottom lip 18, it is expelled into the channel 21 and then into the channel 22. Finally it opens the non-return valve 24 and is expelled via the orifice 27. The motion continues until the position shown in FIG. 2, where the collar 6 is in abutment against the bottom edge 8 of the sleeve 4. The piston is then released and returns downwards under thrust from the spring 9. Air cannot enter the device since the non-return valve 24 is pressed against its seat by the spring 25. Reduced pressure is therefore set up in the chamber 19, and once the head 15 has disengaged the opening through the washer 16, the substance is sucked into the chamber 19.

In order to deliver 20 cubic millimeters of substance, the stroke may be 3 mm and the effective cross-section may be 6.66 mm$^2$. In accordance with an advantageous characteristic of the invention, a small discharge section is obtained by having a ring-shaped pump chamber. As a result its area is accurate and it is technically easy to make.

The substance does not come into contact with the return spring 9. However, it does come into contact with the ball 24 and the spring 25 in the embodiment shown in FIGS. 1 and 2. However this is merely one example of how a non-return valve may be made. Other forms of non-return valve, not including any metal, may be used if so required by the substance.

In the device in accordance with the invention, a non-return valve is used at the substance discharge end. At the suction end, there is no non-return valve. The pressure chamber is closed by a slide valve type of system relying on the displacement of the head without making use of a force due to the pressure of the substance. The use of a non-return valve which would require force to open it in order to fill the metering chamber would lead to poor filling and would reduce metering accuracy. For volumes of the kind which the invention sets out to dispense, the absence of an upstream non-return valve is a factor contributing to accuracy. This characteristic, in combination with the annular shape of the chamber makes it possible to achieve the desired objectives.

Figure 3:
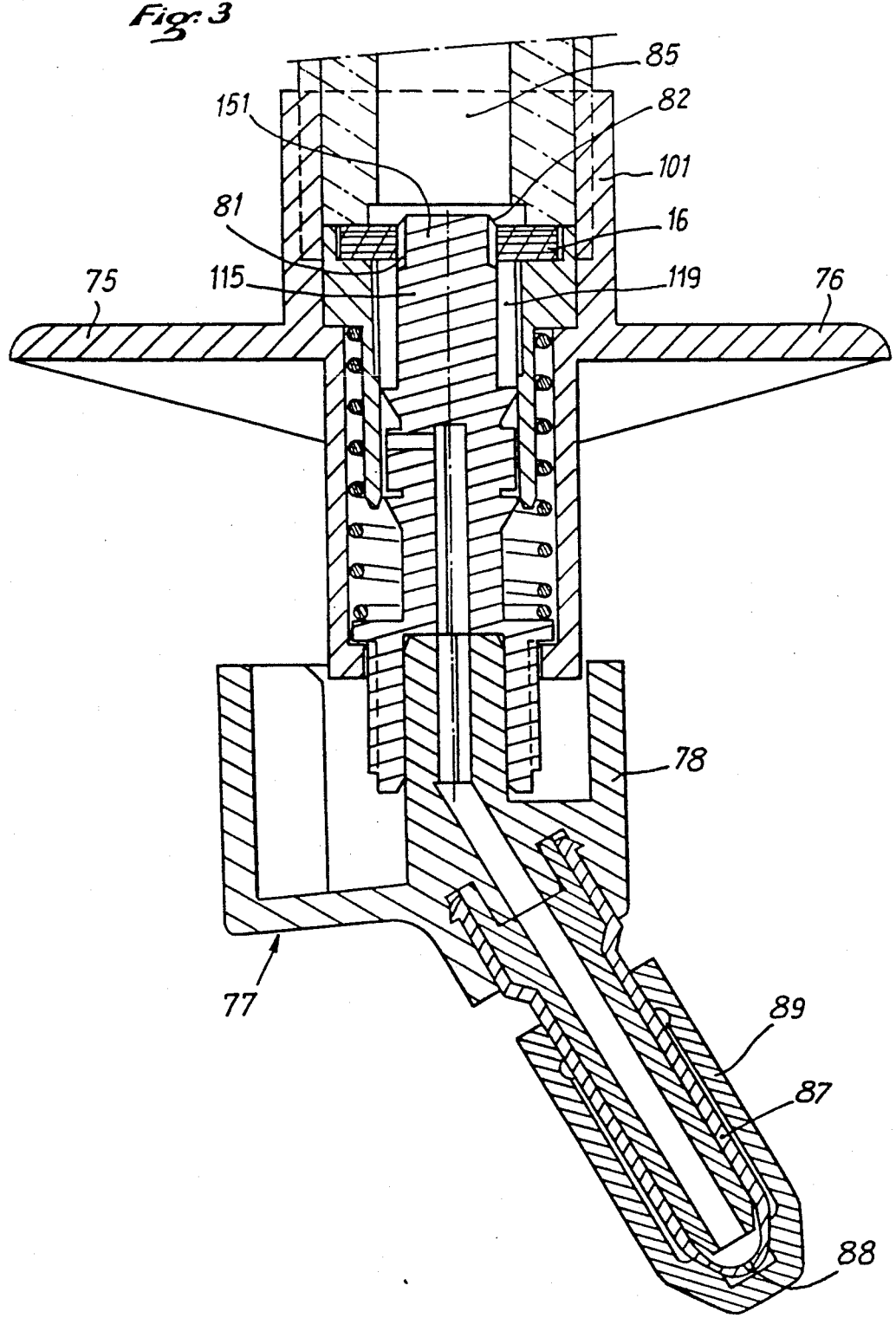
FIGS. 3 and 4 are similar views to FIGS. 1 and 2, but relate to a different embodiment.
Figure 4:
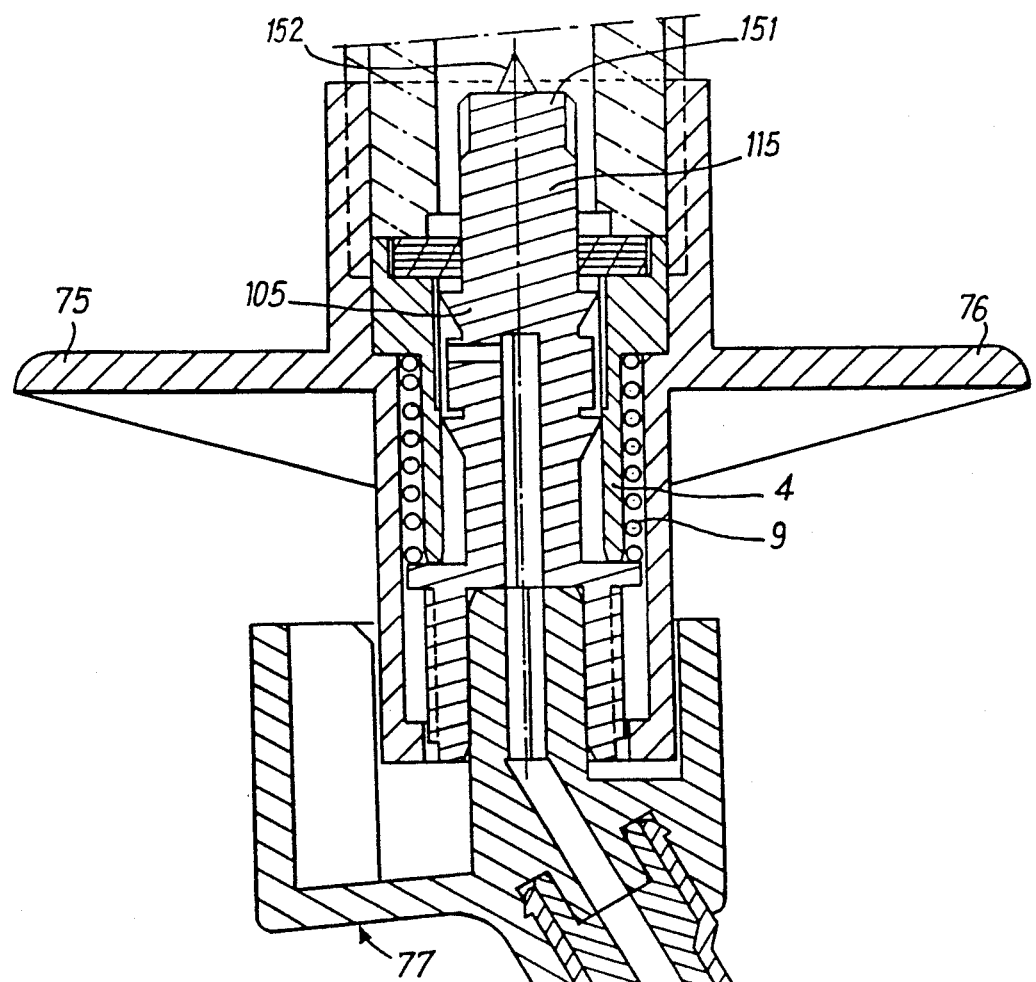

FIGS. 3 and 4 show a variant embodiment of the invention. In FIG. 3, the apparatus is at rest whereas in FIG. 4 it is at the end of its dispensing stroke. The pump body 101 is analogous to that shown in FIGS. 1 and 2. It includes additional finger-engaging wings 75 and 76 enabling the pump to be actuated by co-operation with an oppositely directed thumb-engaging surface 77 on a pushbutton 78. In this variant, the top end 151 of the head 115 projects, in the rest position, slightly beyond the sealing ring 16. This sealing ring is thus permanently subjected to a spreading force. However, in the rest position, slots 81 and 82 formed in the top end of the head 115 provide communication between the inside 85 of the flask and the pump chamber 119. In this embodiment also, there is no upstream non-return valve, but rather a slide valve type of closure arrangement. The outlet non-return valve is constituted by a component made of flexible resilient material such as rubber, and having a slit. The material may be disk-shaped, or else it may be a rubber teat 87, as shown, with a slit 88 at the end of the teat. When substance is being expelled, the teat expands bulb-like, the slit opens and a drop of substance is released. During the suction stroke, the teat contracts and the slit shrinks and closes. Air does not enter. A cap 89 may be provided for protecting the teat when not in use.

The apparatus shown in FIGS. 3 and 4 operates in the same way as the apparatus shown in FIGS. 1 and 2.

The projecting portion 151 of the head 115 of the piston 105 may be used to break a closure capsule of a flask of ophthalmological substance, for example. It is also possible to provide a sharp projection 152 (FIG. 4) on said end face of the head 115, for this purpose.

Figure 5:
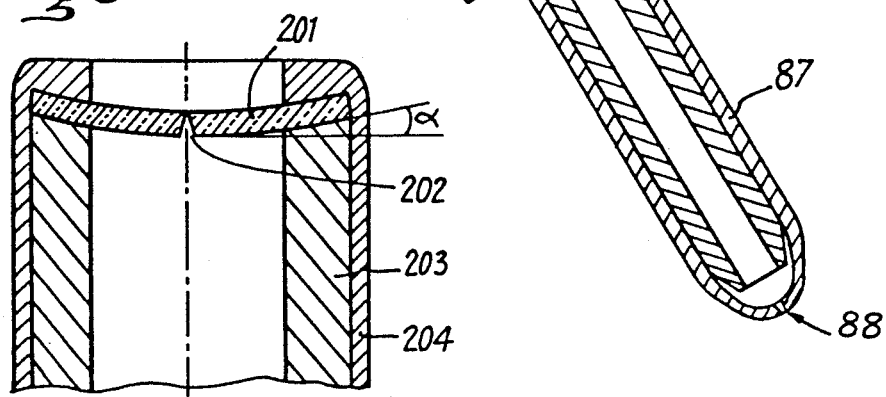
FIG. 5 is a section through a variant outlet non-return valve.

FIG. 5 is an axial section through a variant outlet valve. It may be constituted by a disk 201 having a slit 202 and held between two concentric sleeves 203 and 204. The disk 201 may be molded and/or held in place so as to have a slightly dished curvature as shown. The periphery of the disk shaped in this way may be at an angle alpha of up to about 15° with the perpendicular plane, depending on the thickness of the disk, thereby providing energy to spare when at rest. In this case, as before, the seal may be molded with its slit. Shrinking on unmolding provides preclamping in the rest position.

The present invention is not limited to the above-described examples; numerous modifications and variants will occur to the person skilled in the art.

I claim:

1. A dispenser device of the piston pump type for dispensing accurate small quantities of a fluid substance, in particular an ophthalmological substance, the device comprising:
   a pump body including a pump chamber having a suction orifice and a discharge orifice;
   a piston movable between two positions within said pump chamber; and
   an actuator rod located at one end of said piston;
   wherein said piston has:
   a central discharge duct running along the axis of the piston and also along said actuator rod;
   two axially separated sealing lips;
   a discharge orifice opening out between said two lips, and in communication with said central discharge duct;
   an extension head located at the end of the piston opposite from the actuator rod and suitable, on piston displacement, for closing said suction orifice;

wherein said pump chamber is formed with shapes in relief disposed in such a manner that a closest one of said sealing lips to said extension head no longer provides sealing when said piston is in positions at which said extension head closes said suction orifice;

wherein said discharge orifice is provided with a non-return valve that opens under the effect of compression pressure inside the pump chamber; and wherein said suction orifice is constituted by the central hole through a sealing washer, with said extension head formed on the piston closing the suction orifice by moving into the hole through the washer.

2. A device according to claim 1, wherein said piston includes a collar for limiting its displacement, said collar being free to move between two abutments fixed to the pump body.

3. A device according to claim 2, wherein one of said abutments is formed on a sleeve engaged in said pump body and fixed thereto.

4. A device according to claim 2, wherein said piston includes a return spring which is received between two cylindrical walls in such a manner as to avoid contact with the fluid inside said pump chamber.

5. A device according to claim 1, wherein said non-return valve at the discharge orifice is constituted by a component made of a flexible resilient material, and having an outlet slit.

6. A device according to claim 5, wherein said component made of flexible material is obtained by molding, with the slit also being provided by the molding.

7. A device according to claim 5, wherein said component is a disk of rubber which is held by its edge so as to form a dished shape.

8. A device according to claim 1, wherein said extension head includes means for piercing a closure capsule of a receptacle to which the device is fitted.

9. A dispenser device of the piston pump type for dispensing accurate small quantities of a fluid substance, in particular an ophthalmological substance, the device comprising:

a pump body including a pump chamber having a suction orifice and a discharge orifice;

a piston movable between two positions within said pump chamber; and an actuator rod located at one end of said piston;

wherein said piston has:

a central discharge duct running along the axis of the piston and also along said actuator rod;

two axially separated sealing lips;

a discharge orifice opening out between said two lips, and in communication with said central discharge duct;

an extension head located at the end of the piston opposite from the actuator rod and suitable, on piston displacement, for closing said suction orifice;

wherein said pump chamber is formed with shapes in relief disposed in such a manner that a closest one of said sealing lips to said extension head no longer provides sealing when said piston is in positions at which said extension head closes said suction orifice;

wherein said discharge orifice is provided with a non-return valve that opens under the effect of compression pressure inside the pump chamber; and wherein said extension head includes means for piercing a closure capsule of a receptacle to which the device is fitted.

10. A device according to claim 9, wherein said piston includes a collar for limiting its displacement, said collar being free to move between two abutments fixed to the pump body.

11. A device according to claim 10, wherein one of said abutments is formed on a sleeve engaged in said pump body and fixed thereto.

12. A device according to claim 10, wherein said piston includes a return spring which is received between two cylindrical walls in such a manner as to avoid contact with the fluid inside said pump chamber.

13. A device according to claim 9, wherein said non-return valve at the discharge orifice is constituted by a component made of a flexible resilient material, and having an outlet slit.

14. A device according to claim 13, wherein said component made of flexible material is obtained by molding, with the slit also being provided by the molding.

15. A device according to claim 13, wherein said component is a disk of rubber which is held by its edge so as to form a dished shaped.

* * * * *